United States Patent [19]

Inada et al.

[11] 4,239,154
[45] Dec. 16, 1980

[54] THERMALLY RESPONSIVE VALVE

[75] Inventors: Masami Inada, Kariya; Nobuyuki Hashimoto; Atsushi Satomoto, both of Toyota, all of Japan

[73] Assignee: Aisin Seiki Kabushiki Kaisha, Kariya City, Japan

[21] Appl. No.: 30,366

[22] Filed: Apr. 16, 1979

[30] Foreign Application Priority Data

May 25, 1978 [JP] Japan .................................. 53-70919

[51] Int. Cl.³ ............................................ G05D 23/08
[52] U.S. Cl. .................................. 236/87; 236/101 C; 123/407; 137/599
[58] Field of Search ........................... 236/87, 101 C; 123/117 A; 137/599

[56] References Cited

U.S. PATENT DOCUMENTS

| 4,007,873 | 2/1977 | Duchek | 236/87 X |
| 4,076,172 | 2/1978 | Inada et al. | 236/48 R |
| 4,100,894 | 7/1978 | Tamura | 123/117 A |

Primary Examiner—Albert J. Makay
Assistant Examiner—William E. Tapolcai, Jr.
Attorney, Agent, or Firm—Oblon, Fisher, Spivak, McClelland & Maier

[57] ABSTRACT

A thermally responsive valve comprising a body separated into two portions and having an inlet port and an outlet port, two passages connecting the inlet port with the outlet port, a bimetal operated valve provided in one of two passages, and a check-valve provided in the other passage for permitting fluid flow from the inlet port to the outlet port. The check-valve is made of elastic material such as synthetic rubber and used as a sealing member between the two portions of the body.

3 Claims, 1 Drawing Figure

U.S. Patent  Dec. 16, 1980  4,239,154
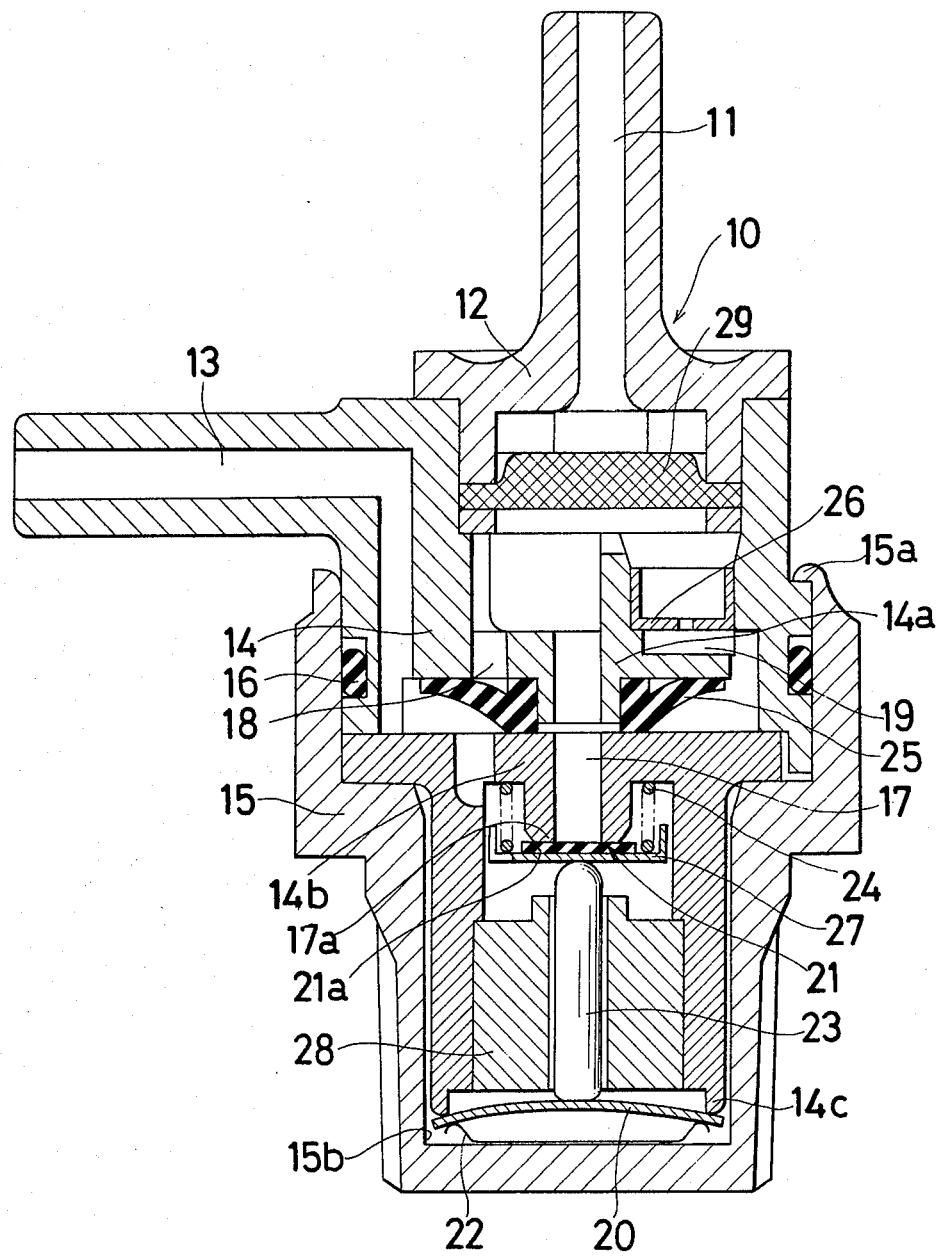

THERMALLY RESPONSIVE VALVE

BACKGROUND OF THE INVENTION

1. Field of the Invention:

This invention relates to a thermally responsive valve, and more particularly to a thermally responsive valve for use in an exhaust emission cleaning system of an automotive vehicle.

2. Description of the Prior Art:

A conventional thermally responsive valve for use in an exhaust emission cleaning system comprises a body with a first passage provided in the body and having a bimetal-operated valve therein, and a second passage provided in the body and having a check-valve therein. The bimetal-operated valve and the check-valve are incorporated in the body to simplify the whole system.

The body is normally separated into an upper portion and a lower portion so that the check-valve made of elastic material such as synthetic rubber may be easily mounted in the body. Further, in order to fluid-tightly connect the upper portion with the lower portion, it is necessary to provide a sealing member such as an O-ring therebetween thereby resulting in an increase in the number of component parts, in troublesome assembling, and in an increase of the cost.

SUMMARY OF THE INVENTION

It is, therefore, the principal object of this invention to provide an improved thermally responsive valve which overcomes the conventional drawbacks as mentioned above.

It is another object of this invention to provide a thermally responsive valve in which a single valve member will act as a check valve for permitting fluid flow only in one direction and as a sealing member between two separate bodies of the valve.

It is a further object of this invention to provide a thermally responsive valve in which the check valve is simple in shape and is easily mounted in the valve body.

BRIEF DESCRIPTION OF THE DRAWINGS

Various other objects, features and attendant advantages of the present invention will be more fully appreciated as the same becomes better understood by the following detailed description when considered in connection with the accompanying drawings in which like reference characters designate like or corresponding parts throughout the several views, and wherein:

FIG. 1 is a longitudinal sectional view of a thermally responsive valve according to this invention.

DETAILED DESCRIPTION OF THE PREFERRED EMBODIMENT

Referring now to the drawing, a thermally responsive valve 10 is provided with a first body member 12 having an inlet port 11 and a second body member 14 having an outlet port 13. The first body member 12 and the second body member 14 are combined fluid-tightly with each other by a suitable connecting means such as an ultrasonic welding. The second body member 14 is inserted in a casing 15 and a sealing O-ring 16 is disposed between the second body member 14 and the casing 15. The second body member 14 and the casing 15 are combined with each other into one unit by caulking at 15a. The casing 15 is made of a thermally conductive metal material, and is positioned in a water jacket (not shown) in which water for cooling an engine is reserved.

The second body member 14 is provided with a first passage 17, a second passage 18 and a third passage 19 therein, all of which are parallel to each other and all of which communicate with the inlet port 11 and the outlet port 13.

The second body member 14 is separated into an upper portion 14a and a lower portion 14b.

The upper portion 14a is provided with an umbrella-type check-valve 25 to permit fluid flow only from the second passage 18 to the outlet port 13. The umbrella-type check-valve 25 is also interposed between the upper portion 14a and the lower portion 14b as a sealing member.

The upper portion 14a is also provided with a restriction orifice 26 communicating with third passage 19. The orifice 26 and third passage 19 provide restricted communication between the inlet port 11 and the outlet port 13.

Between the first passage 17 and the outlet port 13, there is disposed a bimetal operated valve 21 comprising a valve member 21a made of elastic material such as synthetic rubber so as to cooperate with a seat 17a provided at the lower end of the first passage 17. The valve member 21a is adhesively attached to a cup-shaped retainer 27 and a spring 24 is interposed between the cup-shaped retainer 27 and the lower portion 14b.

At the central cavity 15b of the casing 15, there is positioned a dish spring 22 on which a bimetal member 20 is mounted. The outer periphery of the bimetal member 20 is interposed between an annular projection 14c of the lower portion 14b and an outer periphery of the dish spring 22.

Between the retainer 27 and the bimetal member 20 is disposed a rod 23 which passes loosely through a sleeve 28 securely fitted in the lower portion 14b. When the temperature of the cooling water exceeds a set limit, the bimetal member 20 is distorted so as to be upwardly convex so that the valve member 21a is moved into engagement with the seat 17a as shown to close the passage 17. When the temperature of the cooling water is below the set limit, the valve member 21a is out of engagement with the seat 17a by the downward biasing force of the spring 24, permitting the passage 17 to open thereby communicating the inlet and outlet ports through passage 17.

Further, a filter 29 is provided in the first body member 12 to clean the fluid by eliminating foreign substances contained in the fluid.

When the inlet port 11 is connected to an advance port of a carburetor while the outlet port 13 is connected to a servomeans which will actuate an engine spark timing control means of a distributor, the well-known engine spark timing control system is constituted.

Further, from the description above mentioned, the thermally responsive valve may be obviously applicable in an air injection system or an exhaust gas recirculation system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermally responsive valve comprising a body provided with an inlet port and an outlet port and separated into an upper portion and a lower portion spaced from said upper portion;

first, second, and third passages arranged in parallel to one another provided in said body and connecting said inlet port with said outlet port respectively, wherein a part of said first passage is defined by said lower and upper portions of said body and the space therebetween, and a part of said third passage encloses said part of said first passage defined by said space;

a bimetal operated valve disposed in said first passage; and a check-valve having a base and a lip portion and having said base portion positioned between said third passage and said first passage for permitting fluid flow only from said inlet port to said outlet port, wherein said checkvalve is made of elastic material and said base is disposed between and sealingly contacts said upper portion and said lower portion to maintain a fluid-tight sealing therebetween and to fluid tightly separate said parts of said first and third passages and wherein said lip portion permits fluid flow through said second passage only from said inlet to said outlet.

2. A thermally responsive valve according to claim 1, wherein said check-valve is of an umbrella-type.

3. The thermally responsive valve of claim 1, wherein said third passage includes a restriction orifice which always communicates said inlet and outlet ports.

* * * * *